(12) United States Patent
Han

(10) Patent No.: US 12,553,469 B2
(45) Date of Patent: Feb. 17, 2026

(54) LINEAR MODULE

(71) Applicant: Ewellix AB, Gothenburg (SE)

(72) Inventor: Doowon Han, Gyeonggi-do (KR)

(73) Assignee: Ewellix AB, Gothenburg (SE)

( * ) Notice: Subject to any disclaimer, the term of this patent is extended or adjusted under 35 U.S.C. 154(b) by 133 days.

(21) Appl. No.: 18/454,239

(22) Filed: Aug. 23, 2023

(65) Prior Publication Data

US 2024/0110615 A1   Apr. 4, 2024

(30) Foreign Application Priority Data

Sep. 29, 2022   (DE) ...................... 10 2022 125 217.5

(51) Int. Cl.
*F16C 29/08* (2006.01)
(52) U.S. Cl.
CPC ................................. *F16C 29/084* (2013.01)
(58) Field of Classification Search
CPC ...... F16C 29/08; F16C 29/082; F16C 29/084; F16C 29/088
See application file for complete search history.

(56) References Cited

U.S. PATENT DOCUMENTS

| 5,131,125 A | 7/1992 | Coron |
| 6,200,030 B1* | 3/2001 | Katoh .................... F16C 29/082 384/15 |
| 6,241,230 B1* | 6/2001 | Kawaguchi ............. F16C 29/08 310/12.32 |
| 6,571,932 B1* | 6/2003 | Kawashima ............ F16C 29/08 198/494 |
| 6,749,057 B2* | 6/2004 | Kato ...................... F16C 29/063 198/750.7 |

FOREIGN PATENT DOCUMENTS

| DE | 69105320 T2 | 7/1995 |
| DE | 19738988 A1 | 3/1998 |
| DE | 102006042696 A1 | 3/2008 |

* cited by examiner

*Primary Examiner* — James Pilkington
(74) *Attorney, Agent, or Firm* — Laurence A. Greenberg; Werner H. Stemer; Ralph E. Locher

(57) ABSTRACT

A linear module has a housing, at least one guide rail on a bottom wall within the housing, and a carriage that is longitudinally translatable relative to the housing on the guide rail. The carriage extends from within the housing through at least one longitudinal slit in a side face of the housing perpendicular to the bottom wall to an outside of the housing. At least one flexible slit seal seals the longitudinal slit in a section of the slit where the carriage does not project through the slit.

10 Claims, 4 Drawing Sheets

LINEAR MODULE

CROSS-REFERENCE TO RELATED APPLICATION

This application claims the priority, under 35 U.S.C. § 119, of German Patent Application DE 10 2022 125 217.5, filed Sep. 29, 2022; the prior application is herewith incorporated by reference in its entirety.

FIELD AND BACKGROUND OF THE INVENTION

The present invention relates to a linear module.

In the art, linear modules are known for translating loads, e.g., machine parts. Such linear modules usually comprise a carriage running on a guide rail, wherein the load is attachable to the carriage. The load can then be moved by driving the carriage, e.g., by means of a linear drive such as a ball screw or a roller screw.

Linear modules are often used in dirty or dusty environments. Therefore, in order to prolong service life and/or reduce maintenance, component parts such as linear drives or bearings are arranged inside a housing. However, in order to establish a connection between the load and the carriage, an opening in the housing must remain. For reducing the amount of dirt or dust entering the housing, it is known to at least partially seal the opening.

SUMMARY OF THE INVENTION

It is accordingly an object of the invention to provide a linear drive which overcomes a variety of disadvantages associated with the heretofore-known devices and methods of this general type and which provides for an enhanced linear module, in particular with increased protection of the linear module against dirt or dust.

With the above and other objects in view there is provided, in accordance with the invention, a linear module, comprising:
  a housing having a bottom wall and a side face perpendicular to the bottom wall;
  at least one guide rail on the bottom wall within the housing;
  a carriage disposed on the at least one guide rail and being longitudinally translatable relative to the housing on the at least one guide rail, the carriage extending from within the housing through at least one longitudinal slit formed in the side face of the housing perpendicular to the bottom wall to an outside of the housing; and
  at least one flexible slit seal sealing the longitudinal slit in a section where the carriage does not project through the longitudinal slit.

A linear module according to a first aspect of the invention comprises a housing, at least one guide rail arranged on a bottom wall within the housing, and a carriage being longitudinally translatable relative to the housing on said guide rail. The carriage extends from within the housing through at least one longitudinal slit in a side face of the housing perpendicular to the bottom wall to an outside of the housing. Further, at least one flexible slit seal is provided, the slit seal sealing the slit in a section where the carriage does not extend through the slit.

The term "longitudinal" in the sense of the present invention preferably refers to a direction defined by a main axis of the linear module. Advantageously, the main axis corresponds to an axis along which the linear module supports movement, i.e., a movement axis of the carriage. The main axis—and hence the "longitudinal" direction—may thus be defined by the orientation of the guide rail, which guides the movement of the carriage.

An aspect of the invention is based on the approach of providing a linear module housing having a longitudinal slit in at least one side face of the housing. In other words, it is suggested to advantageously provide a housing having a longitudinal opening in at least one of its sides. This configuration provides enhanced protection in dirty or dusty environments compared to conventional linear module configurations. That is because gravity acts parallel to the sides and thus the probability of particles sinking into the slit can be greatly reduced compared to conventional linear modules, where openings are usually located on a top side of the housing. Additionally, the number of parts can be reduced, as conventional configurations with housings having the opening on a top side usually require an additional top cover extending above the top opening to achieve sufficient protection from dirt or dust.

The slit may be through-engaged by a carriage translationally supported inside the housing. I.e., the carriage may reach through the slit such that it is accessible from the outside, for example to attach a load such as a machine part to the carriage. An effective protection against environmental influences may be achieved by at least sectionally sealing the slit with a flexible slit seal. Preferably, the slit seal is arranged in a section where the carriage does not extend through the slit. Further preferably, the slit seal is movably mounted in the housing. Advantageously, the slit seal is movable with the carriage such that even upon movement of the carriage, the whole slit remains sealed.

Longitudinal movement of the carriage is preferably guided by at least one guide rail arranged on a bottom wall within the housing. Advantageously, the carriage may be supported by the guide rail, i.e., the guide rail may receive any force acting on the carriage. The bottom wall preferably corresponds to a base of the linear module. Advantageously, the bottom wall is horizontally oriented and/or may be fastened to a horizontal surface, e.g., of a machine or the floor.

The linear module may comprise a linear drive such as a ball screw or roller screw. The linear module may additionally comprise an electric motor for driving the linear drive. Preferably, a threaded or grooved spindle of the linear drive extends longitudinally within the housing, advantageously parallel to the at least one guide rail. The spindle may be rotationally supported within the housing by means of a bearing assembly. Rotation of the spindle preferably urges a spindle nut of the linear drive to longitudinally move along the spindle. The spindle nut may be part of the carriage or fastened to the carriage.

Preferred embodiments of the invention, which are described below, may, unless expressly excluded, be combined with each other as desired in a variety of combinations.

In accordance with an added feature of the invention, the slit seal comprises a flexible band. This allows tight sealing of the slit even during longitudinal movement of the carriage.

It is preferred for the flexible band to be fabricated from plastics. For example, the flexible band may comprise polyurethane (PU). By this means, sufficient flexibility of the band can be achieved. Yet, the band can remain stable enough for providing an effective sealing of the slit.

Alternatively or additionally, the flexible band is movable relative to the housing by means of a roller assembly arranged inside the housing. Preferably, the flexible band is movable together with the carriage. To this end, the flexible band can be fastened to the carriage such that the band moves along with the carriage. By this means, the occurrence of unsealed slit sections due to carriage movements can be prevented.

In accordance with another preferred embodiment, a first end of the band is attached at a first axial end of the carriage, and a second end of the band is attached at a second axial end of the carriage opposite to the first axial end. An axial end in the sense of the present invention is preferably a front or rear end of the carriage. For example, the first and second axial ends can be defined by a front or end face of the carriage perpendicular to the direction of movement of the carriage, respectively. Preferably, the flexible band forms a loop closed by the carriage. The band may be wrapped around a plurality of rollers of the roller assembly in a circular manner. This configuration allows to maintain a constant tension in the flexible band irrespective of the position or movement of the carriage relative to the housing.

In yet another preferred embodiment, the first and second end of the band is attached to the carriage by clamping. In other words, the first and second end may be clamped between two components of the carriage, in particular an attachment device of the carriage. For example, the carriage may comprise at least two pairs of clamping blocks. Then, the first and second end of the band is preferably clamped in between a pair of said clamping blocks, respectively. Attaching the band by clamping may greatly reduce effort for assembly of the linear module.

In yet another preferred embodiment, the linear module comprises a slit seal tensioning device. This may allow to adjust the tension of the slit seal, particularly the flexible band, as required. In particular, the tension may be fine-tuned even after assembly of the linear module. What is more, the tension may be kept constant despite wear of the slit seal, enabling a long service life, long-term reliable operation of the linear module, and/or reduced maintenance effort.

In accordance with yet a further preferred embodiment, the slit seal tensioning device is accessible, particularly operable, from outside of the housing. By this means, a disassembly of the linear module, in particular an opening of the housing, is not even partially required for adjusting the tension of the slit seal.

It is advantageous that the slit seal tensioning device may be operated by means of a conventional tool, for example a screwdriver or a hex wrench.

In yet another preferred embodiment, the tension of the slit seal is continuously adjustable by means of the slit seal tensioning device. In contrast to a tensioning in discrete steps, the tension of the slit seal may be adjusted precisely as required.

In yet another preferred embodiment, the slit seal is attached to the carriage by means of at least two attachment devices. Particularly, each of the attachment devices secures one of the first and second end of the slit seal at the first or second axial end of the carriage, respectively. Preferably, each of the attachment devices comprises a pair of clamping blocks. Each pair of clamping blocks may receive an end of the slit seal. The clamping blocks of each pair are preferably fastened together, e.g., by means of one or more screws, thereby clamping the ends of the slit seal received in between the clamping blocks.

The longitudinal position of at least one of the clamping blocks of at least one of the pairs relative to the carriage may be adjusted, preferably so as to achieve a preferred tension of the slit seal. For example, at least one of the clamping blocks of at least one pair may be longitudinally moved to a selected longitudinal position by means of a first tensioning screw. Alternatively or additionally, at least one of the clamping blocks of at least one of the pairs may be fastened to the carriage, preferably at a longitudinal position selectable by a user. For example, at least one of the clamping blocks of at least one pair may be fastened at a selected longitudinal position by means of a second tensioning screw.

Hence, the slit seal tensioning device preferably comprises at least one first tensioning screw screwed into a threaded hole of the carriage, particularly in a front face or end face of the carriage or an attachment body of the carriage. Advantageously, the at least one first tensioning screw is provided for adjusting a longitudinal position of at least one of the attachment devices relative to the carriage. In this configuration, a position of at least one of the attachment devices relative to the carriage is longitudinally adjustable by operating the at least one first tensioning screw, i.e., screwing the at least one first tensioning screw further into the corresponding threaded hole or further out of said threaded hole.

Alternatively or additionally, the slit seal tensioning device preferably comprises at least one second tensioning screw reaching through an, advantageously longitudinal, elongated hole in a section of the carriage outside of the housing. Advantageously, the at least one second tensioning screw is provided for fastening at least one of the attachment devices to the carriage. In this configuration, the position of the at least one attachment device relative to the carriage is fixable, e.g., by longitudinally moving the attachment device by means of the at least one first tensioning screw, and then securing the attachment device at the desired position by fastening the at least one second tensioning screw in the elongated hole.

Preferably, the at least one first tensioning screw and the at least one second tensioning screw are arranged perpendicular to each other. This allows to utilize the first tensioning screw(s) for adjusting the tension of the slit seal, and the second tensioning screw(s) for immobilizing the ends of the slit seal once the desired tension is achieved.

In yet another preferred embodiment, the housing comprises two side walls perpendicular to the bottom wall, and a top wall opposite of the bottom wall. Preferably, the at least one slit is defined by a gap between the top wall and at least one of the side walls. By this means, each of the bottom wall, the side walls and the top wall may be integral. Further, the carriage may extend out of the housing directly below the top wall, reducing headroom.

In yet another preferred embodiment, the top wall comprises a projection along at least one of its longitudinal edges. Particularly, the top wall may be substantially u-shaped. Preferably, the u-shaped top wall is open towards the bottom wall. In other words, the at least one projection preferably extends, advantageously substantially perpendicular to a top face of the housing, towards the bottom wall, i.e., downwards. For example, the longitudinal edges of the top wall may be bent towards the bottom wall.

Advantageously, at least one of the side walls is stepped in a section facing the top wall. In other words, a section of the side wall extends into the housing such that a longitudinal recess is formed in the side face of the housing. Providing at least one stepped side wall may simplify arrangement of the slit seal in an effective sealing position, particularly during assembly of the linear module.

Preferably, the slit seal is arranged transversely and at least sectionally in between the projection of the top wall and the stepped section of the side wall. "Transversely" in the sense of the present invention preferably corresponds to a direction perpendicular to the main axis of the linear module, i.e., perpendicular to the longitudinal direction. In other words, the slit seal is preferably arranged laterally and at least sectionally in between the projection of the top wall and the stepped section of the side wall.

The properties, features and advantages of the invention described above, as well as the manner in which they are achieved, will be explained in more detail in connection with the figures in the following description of examples. Where appropriate, the same reference signs are used in the figures for the same or corresponding elements of the invention. The examples serve to explain the invention and do not limit the invention to the combinations of features indicated therein, even with respect to functional features. Moreover, any of the features disclosed in the above description as well as in the examples below may be considered in isolation and suitably combined with the features of any of the above embodiments and their further aspects.

DETAILED DESCRIPTION OF THE INVENTION

Figure 1:
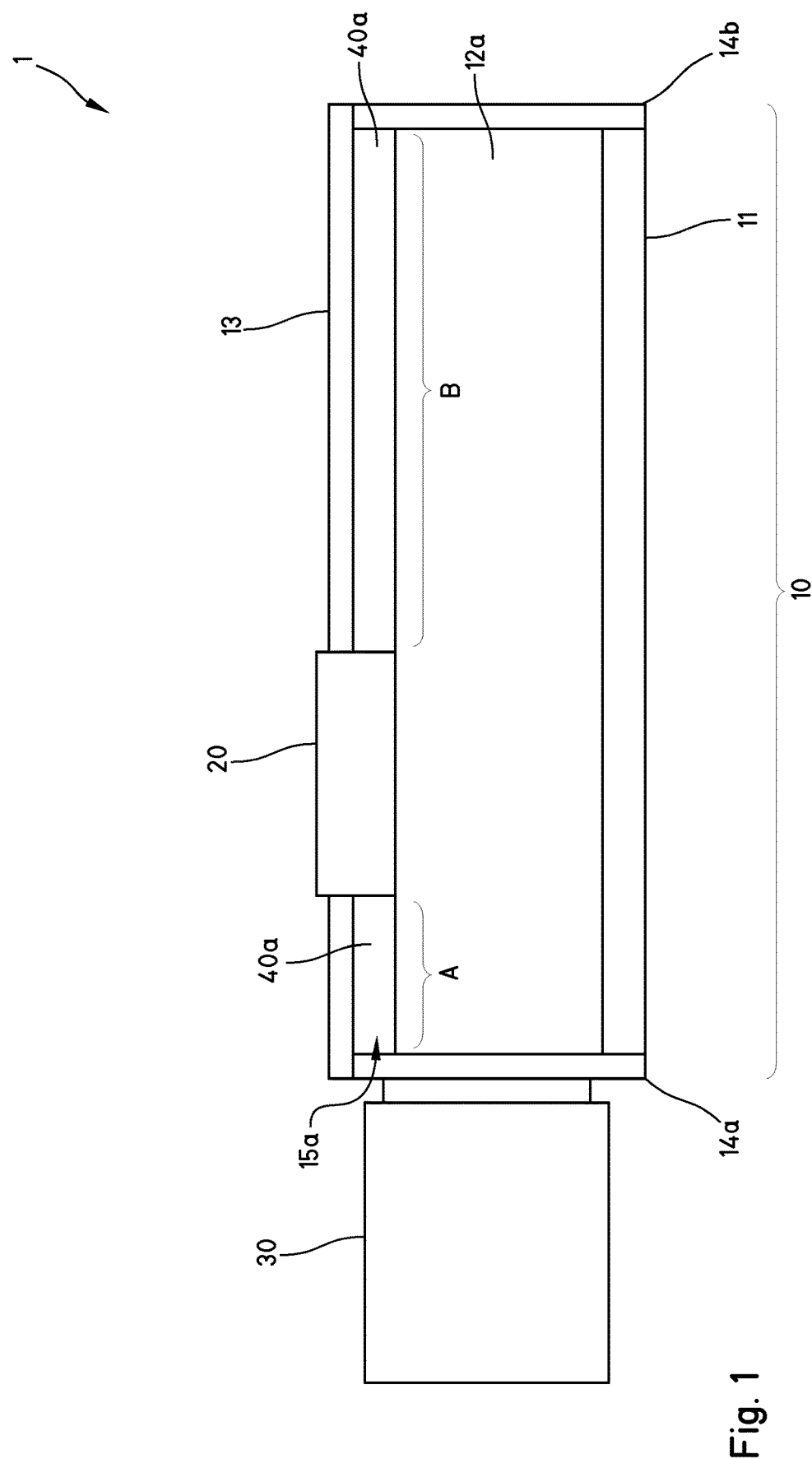
FIG. 1 is a diagrammatic side view of an exemplary linear module.

Referring now to the figures of the drawing in detail and first, in particular, to FIG. 1 thereof, there is shown an example of a linear module 1 comprising a housing 10, a carriage 20, and an (optional) electric motor 30. The housing 10 has a bottom wall 11 or base, a pair of side walls (of which only one side wall 12a is visible in FIG. 1), and a top wall 13. Advantageously, the housing 10 also has a pair of end walls 14a, 14b. The several walls define a protected space within the housing 10. The carriage 20 is movably supported within the housing 10, wherein only a part of the carriage 20 extends from within the housing 10 through at least one longitudinal slit 15a in a side face of the housing 10 to the outside of the housing 10. At least one flexible slit seal 40a is provided, the slit seal 40a sealing the slit 15a in a section A, B where the carriage 20 does not extend through the slit 15a.

The longitudinal slit 15a is preferably defined by a gap between the side wall 12a and the top wall 13. In order to be able to provide a maximum of travel distance for the carriage 20, the slit 15a advantageously extends substantially along the entire length of the housing 10. Preferably, the slit 15a is axially confined between the end walls 14a and 14b.

The electric motor 30 is preferably operatively connected to a linear drive (see, FIG. 2) of the linear module 1. The linear drive is arranged within the housing 10. By driving the linear drive with the motor 30, the carriage 20—and a load attached to the part of the carriage 20 that projects from the housing 10—can be moved relative to the housing 10.

Figure 2:
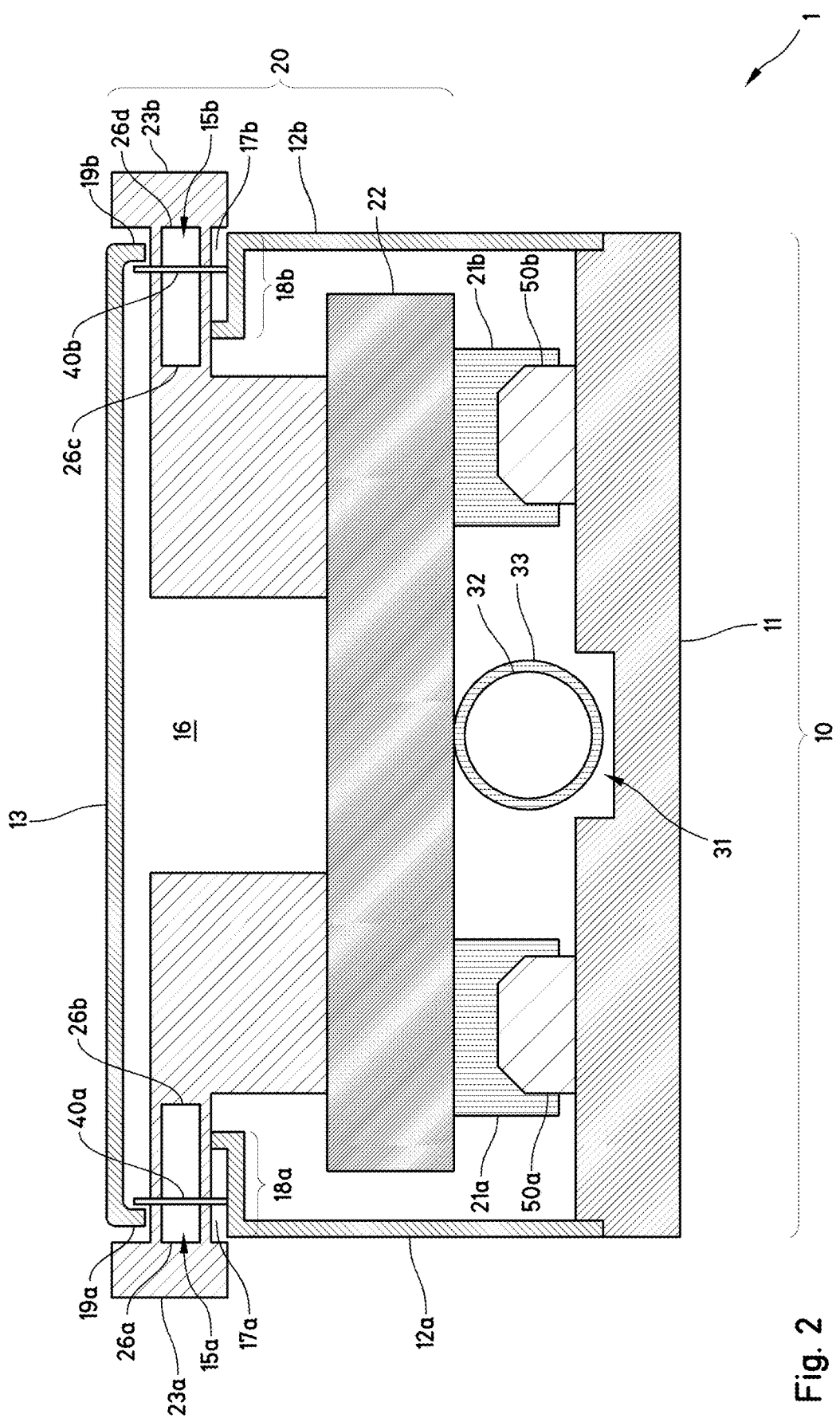
FIG. 2 a cross section taken through the linear module shown in FIG. 1.

FIG. 2 shows the linear module 1 of FIG. 1 in a cross-sectional view. The bottom wall 11, the side walls 12a, 12b and the top wall 13 define an inner space 16 within the housing 10. Within this space 16, at least one guide rail—a pair of guide rails 50a, 50b in the present example—is arranged on the bottom wall 11. Further, substantially the entire carriage 20 is arranged within the inner space 16 and, preferably, only a part of the carriage 20 extends through the at least one slit—two slits 15a, 15b in the present example. The carriage 20 runs on the guide rails 50a, 50b. The guide rails 50a, 50b support the carriage 20 and a load attached to the carriage 20.

For example, the carriage 20 may comprise at least one bearing component—two bearing components 21a, 21b in the present example—operationally coupled to one of the guide rails 50a, 50b. Each of the bearing components 21a, 21b and the respective guide rail 50a, 50b may form a linear bearing for movably supporting the carriage 20 within the housing 10. To this end, the bearing components 21a, 21b each may comprise a cage for arranging a plurality of rolling elements between the respective guide rail 50a, 50b and the carriage 20, or a pathway for circulating a plurality of rolling elements.

As an option, a linear drive 31, for example a ball screw or a roller screw, is arranged within the space 16. For example, the linear drive 31 may be arranged transversely between the guide rails 50a, 50b. Preferably, the linear drive 31 comprises a threaded or groove spindle 32 and a spindle nut 33 operatively coupled to the spindle 32. The spindle nut 33 is advantageously fastened to the carriage 20, such that upon rotation of the spindle 32, the spindle nut 33 and the carriage 20 longitudinally move along the spindle 32 and the guide rails 50a, 50b, respectively.

In the example shown in FIG. 2, the carriage 20 comprises a main body 22 and at least one attachment body—two attachment bodies 23a, 23b in the present example. Preferably, the main body 22 is completely arranged within the housing 10. The attachment bodies 23a, 23b may be fastened to the main body 22, for example by means of screws. Alternatively, the attachment bodies 23a, 23b may be integral with the main body 22. Each of the attachment bodies 23a, 23b partially extends from within the housing 10 through one of the slits 15a, 15b to the outside of the housing 10.

The at least one flexible slit seal—two flexible slit seals 40a, 40b in the present example—is attached to one of the attachment bodies 23a, 23b, for example clamped between two clamping blocks 26a, 26b, 26c, 26d at each of its ends. The slit seals 40a, 40b seal the respective slit 15a, 15b.

Preferably, the slit seals 40a, 40b are attached to the attachment bodies 23a, 23b and/or configured, e.g., dimensioned, such that they bridge a gap between the respective side wall 12a, 12b and the top wall 13. For example, each of the slit seals 40a, 40b may be arranged in a recess 17a, 17b in one of the side faces of the housing 10. The recesses 17a, 17b preferably extend longitudinally along the side faces of the housing 10. The recesses 17a, 17b may correspond to, particularly form a part of, the slits 15a, 15b.

Preferably, the recesses 17a, 17b are defined by a stepped section 18a, 18b of each of the side walls 12a, 12b. Accordingly, the stepped sections 18a, 18b of the side walls 12a, 12b are oriented towards the top wall 13. In the stepped sections 18a, 18b, the respective side wall 12a, 12b preferably protrudes into the housing 10.

Alternatively or additionally, the top wall 13 may comprise at least one projection—two projections 19a, 19b in the present example—along at least one of its longitudinal edges. Preferably, the projections 19a, 19b extend downwards, towards the bottom wall 11. For example, the top wall 13 may comprise edges bent towards the bottom wall 11, the bent edges defining the projections 19a, 19b.

Preferably, each of the slit seals 40a, 40b is transversely, i.e., laterally, arranged in between one of the projections 19a, 19b and the respective stepped section 18a, 18b of the side walls 12a, 12b.

It will be understood that, when the housing 10 is formed with only one longitudinal slit, only one recess may be provided, and only one of the side walls 12a, 12b may comprise a stepped section. Likewise, the top wall 13 would only comprise one lateral, downward projection 19a or 19b.

Figure 3:
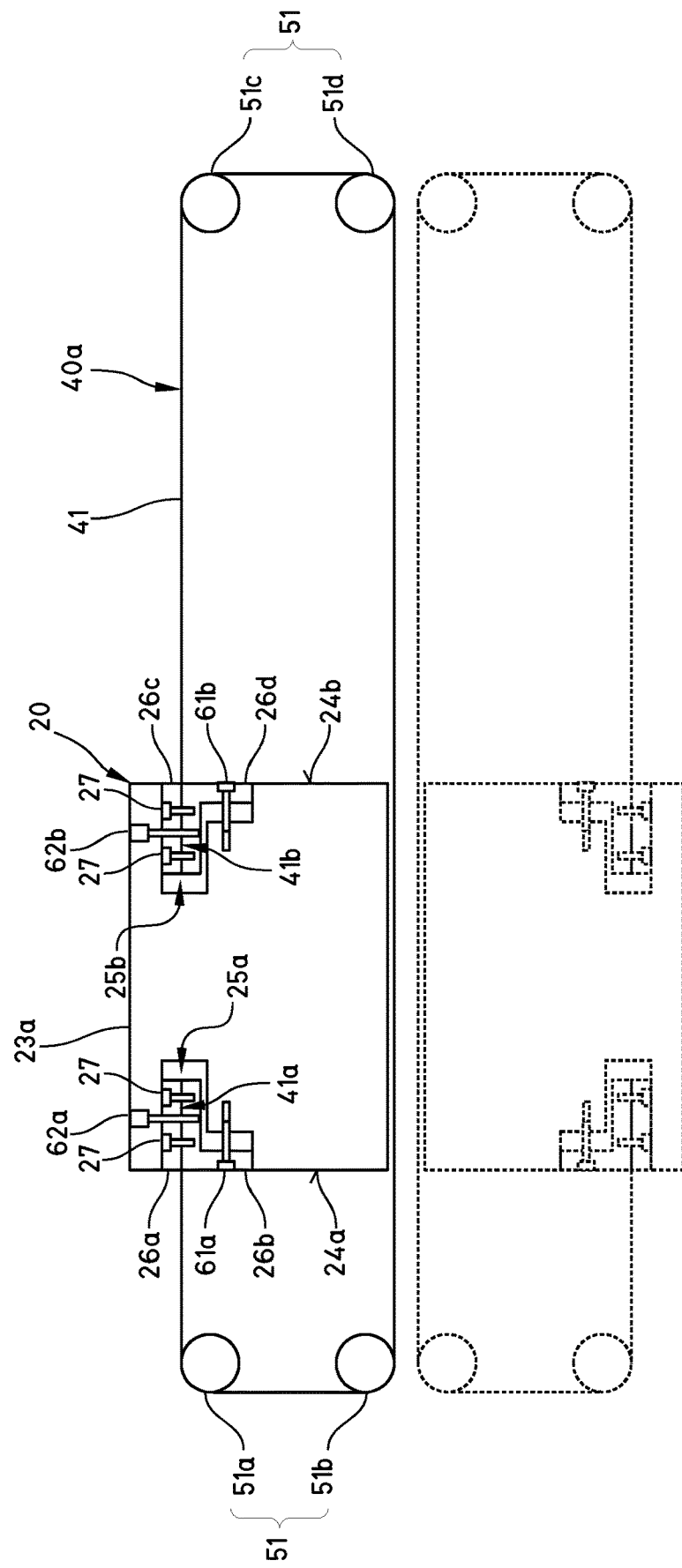
FIG. 3 shows an example of a flexible slit seal attached to a carriage.

FIG. 3 shows an example of a flexible slit seal 40a attached to a carriage 20 of a linear module, in particular to an attachment body 23a of the carriage 20. In a linear module as shown in FIG. 2, a second slit seal may be arranged in a symmetric configuration to the carriage, in particular to a second attachment body of the carriage 20. The symmetrically disposed assembly is indicated by dashed lines.

The flexible slit seal 40a comprises a flexible band 41 wrapped around a roller assembly 51 comprising a plurality of rollers 51a, 51b, 51c, 51d. A first end 41a of the band 41 is attached to the carriage 20 at a first axial end 24a of the carriage 20. Likewise, a second end 41b of the band 41 is attached to the carriage 20 at a second axial end 24b of the carriage 20.

To this end, the carriage 20 may comprise at least two attachment devices 25a, 25b. Each of the attachment devices 25a, 25b preferably comprises a pair of clamping blocks 26a, 26b or 26c, 26d. Accordingly, each of the ends 41a, 41b may be clamped in between two clamping blocks 26a, 26b or 26c, 26d, respectively. The two clamping blocks 26a, 26b or 26c, 26d of each pair may be fastened to each other by means of screws 27.

The position of at least one pair of clamping blocks 26a, 26b or 26c, 26d relative to the carriage 20 may be adjusted by way of a respective first tensioning screw 61a, 61b. Further, at least one of the clamping blocks 26a, 26b or 26c, 26d of each pair may be fastened to the carriage 20, e.g., by way of a second tensioning screw 62a, 62b.

Figure 4:
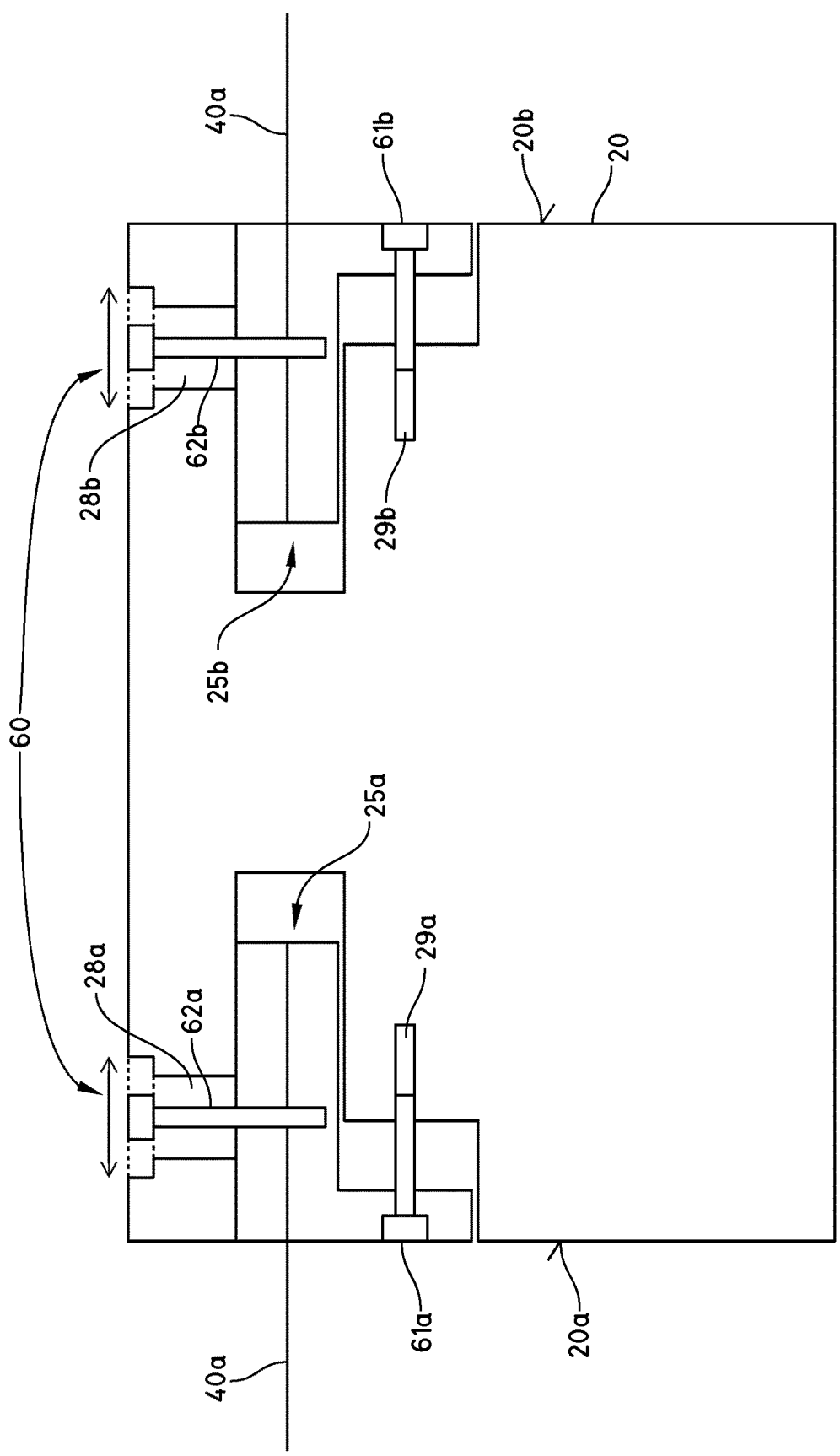
FIG. 4 illustrates an exemplary tensioning device.

FIG. 4 shows an example of a slit seal tensioning device 60 for adjusting the tension of a flexible slit seal 40a attached to a carriage 20 of a linear module. The tensioning device 60 comprises at least one first tensioning screw—two first tensioning screws 61a, 61b in the present example—for adjusting the longitudinal position of each of at least two attachment devices 25a, 25b relative to the carriage 20. To this end, each of the first tensioning screws 61a, 61b may be screwed further into or further out of a respective threaded hole 29a, 29b in a front face 20a or end face 20a of the carriage 20. By adjusting the longitudinal position of at least one of the attachment devices 25a, 25b, the tension of the slit seal 40a may be adjusted (cf. FIG. 3).

The tensioning device also comprises at least one second tensioning screw—two second tensioning screws 62a, 62b in the present example—for fastening at least one of the two attachment devices 25a, 25b to the carriage 20, preferably in a desired position as adjusted by the first tensioning screws 61a, 61b. The second tensioning screws 62a, 62b preferably each reach through a longitudinally elongated hole 28a, 28b in the carriage 20, in particular in a part of the carriage 20 extending from a housing of the linear module (see, FIG. 2). Each of the elongated holes 28a, 28b is advantageously accessible from outside of the housing.

Each of the second tensioning screws 62a, 62b is selectively positionable in a desired position in the respective through-hole 28a, 28b, as indicated by the double-headed arrows, e.g., by operating the first tensioning screws 61a, 61b. When tightening the respective second tensioning screw 62a, 62b, the respective attachment device 25a, 25b is secured to the carriage 20. This allows for fixing the tension of the slit seal 40a as adjusted by means of the first tensioning screws 61a, 61b.

The following is a summary list of reference numerals and the corresponding structure used in the above description of the invention:

1 linear module
10 housing
11 bottom wall
12a, 12b side wall
13 top wall
14a, 14b end wall
15a, 15b longitudinal slit
16 inner space
17a, 17b recess
18a, 18b stepped section
19a, 19b projection
20 carriage
20a, 20b front face, end face
21a, 21b bearing component
22 main body
23a, 23b attachment body
24a first axial end
24b second axial end
25a, 25b attachment device
26a-d clamping block
27 screw
28a, 28b elongated hole
29a, 29b threaded hole
30 electric motor
31 linear drive
32 spindle
33 nut
40a, 40b slit seal
41 band
41a first end
41b second end
50a, 50b guide rail
51 roller assembly
51a-d roller
60 slit seal tensioning device
61a, 61b first tensioning screw
62a, 62b second tensioning screw
A, B section

The invention claimed is:

1. A linear module, comprising:
 a housing having a bottom wall and a side face perpendicular to said bottom wall;
 at least one guide rail on said bottom wall within said housing;
 a carriage disposed on said at least one guide rail and being longitudinally translatable relative to said housing on said at least one guide rail, said carriage extending from within said housing through at least one longitudinal slit formed in said side face of said housing perpendicular to said bottom wall to an outside of said housing;
 at least one flexible slit seal sealing said longitudinal slit in a section where said carriage does not project through said longitudinal slit; and
 a slit seal tensioning device configured for selectively adjusting the tension of the slit seal.

2. The linear module according to claim 1, wherein said slit seal comprises a flexible band formed of plastic, said flexible band being movable relative to said housing by way of a roller assembly arranged inside said housing.

3. The linear module according to claim 2, wherein said flexible band has a first end attached at a first axial end of said carriage, and a second end attached at a second axial end of said carriage opposite said first axial end.

4. The linear module according to claim 3, wherein said first and second ends of said band are clamped to said carriage.

5. The linear module according to claim 1, wherein said slit seal tensioning device is accessible from outside of said housing.

6. The linear module according to claim 1, wherein said slit seal tensioning device has at least one first tensioning screw being configured to enable a tension of said slit seal to be continuously adjustable without discrete steps.

7. The linear module according to claim 1, wherein said slit seal is attached to said carriage by way of at least two attachment devices, said slit seal tensioning device comprises at least one first tensioning screw screwed into a threaded hole of said carriage, and said at least one first tensioning screw is configured for adjusting a longitudinal position of at least one of said attachment devices relative to said carriage.

8. The linear module according to claim 7, wherein said slit seal is attached to said carriage by way of at least two attachment devices, said slit seal tensioning device comprises at least one second tensioning screw reaching through an elongated hole in a section of said carriage outside of said housing, and said at least one second tensioning screw is configured for fastening at least one of said two attachment devices to said carriage.

9. The linear module according to claim 1, wherein said housing comprises two side walls perpendicular to said bottom wall, and a top wall opposite said bottom wall, and wherein said at least one longitudinal slit is defined by a gap between said top wall and at least one of said side walls.

10. The linear module according to claim 9, wherein said top wall is formed with a projection along at least one of its longitudinal edges, and at least one of said side walls is stepped in a section facing said top wall, and said slit seal is arranged transversely and at least sectionally in between said projection and said stepped section of said side wall.

* * * * *